(12) United States Patent
Yoda et al.

(10) Patent No.: US 6,333,840 B1
(45) Date of Patent: Dec. 25, 2001

(54) MAGNETIC RECORDING APPARATUS

(75) Inventors: Hiroaki Yoda; Tadahiko Kobayashi, both of Kanagawa-ken; Kohichi Tateyama, Chiba-ken; Hiromi Sakata, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/270,681

(22) Filed: Mar. 16, 1999

(30) Foreign Application Priority Data

Mar. 16, 1998 (JP) ................................. 10-065209

(51) Int. Cl.[7] ................................. G11B 5/127
(52) U.S. Cl. ............................. 360/313; 360/46
(58) Field of Search ............... 360/46, 314, 315, 360/319, 324, 324.1, 313

(56) References Cited

U.S. PATENT DOCUMENTS 5,739,783 * 4/1998 Tajima .................................. 341/59
5,818,684 * 10/1998 Iwasaki et al. ...................... 360/319
5,864,442 * 1/1999 Naito ..................................... 360/65

OTHER PUBLICATIONS

Frank B. Shelledy, et al., "A Linear Self–Biased Magnetoresistive Head," IEEE Transactions on Magnetics, vol. Mag–11, No. 5, (Sep. 1975), pp. 1206–1208.

* cited by examiner

Primary Examiner—David Hudspeth
Assistant Examiner—Dan I. Davidson
(74) Attorney, Agent, or Firm—Oblon, Spivak, McClelland, Maier & Neustadt, P.C.

(57) ABSTRACT

There is provided a magnetic recording apparatus capable of carrying out signal reproduction with high accuracy by using a narrow gap head structure corresponding to high recording density. An asymmetric gap structure MR head includes a magnetoresistance element 26 having a magnetoresistance film 24 and a pair of electrodes 25 disposed at the upper side; a reproducing magnetic gap film 23 disposed only at the lower side of the magnetoresistance element 26; a magnetic shielding film 22 disposed so as to make a laminate with the magnetoresistance element 26 through the reproducing magnetic gap film 23; and an insulating film 27 disposed at the upper side of the magnetoresistance element 26. When a signal is read by use of such a reproducing head, the signal of the present bit is read by subtracting a value obtained by multiplying signals of a plurality of previous bits by predetermined coefficients from the present reproduction signal. As another reproduction signal processing system, a partial response system is adopted.

10 Claims, 9 Drawing Sheets

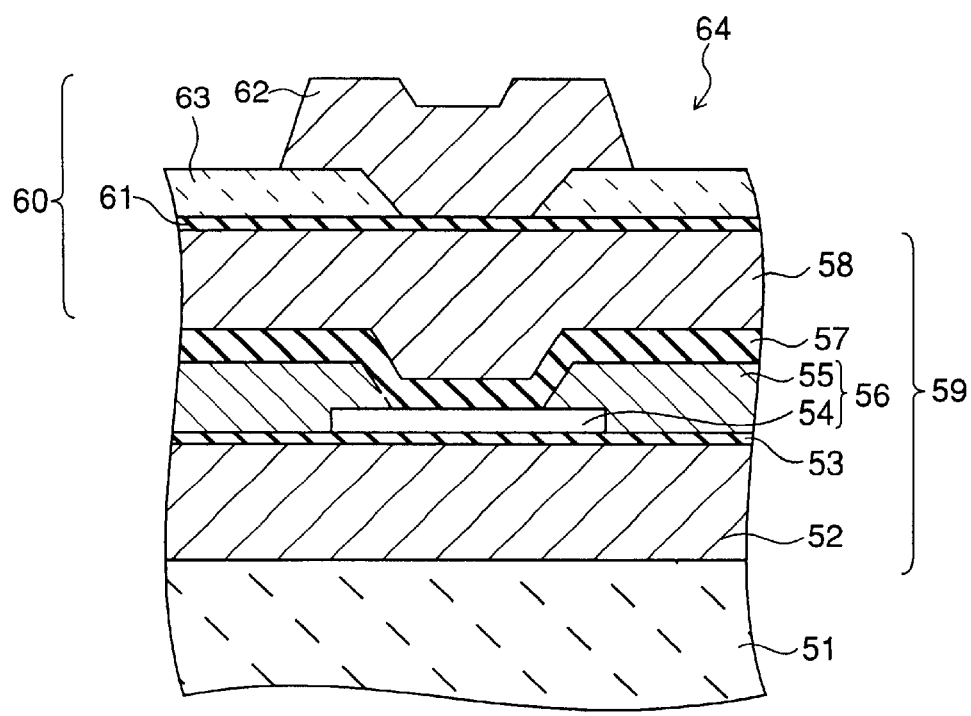
FIG. 9
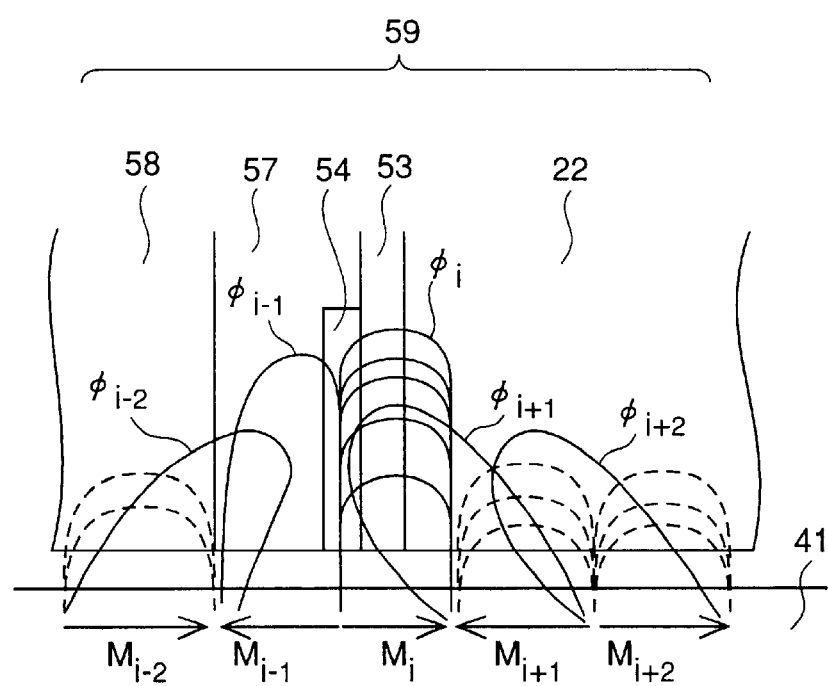

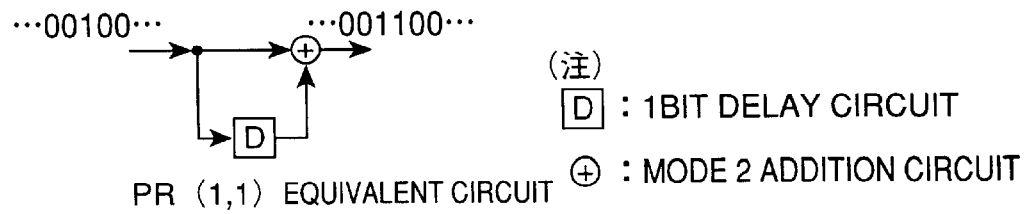
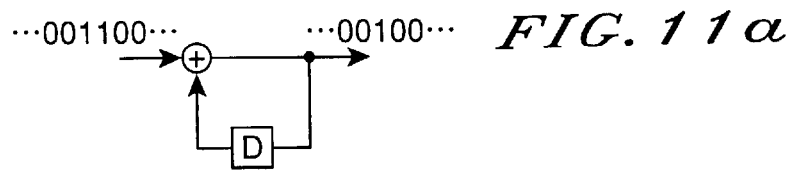
*FIG. 11a*
*FIG. 11b*
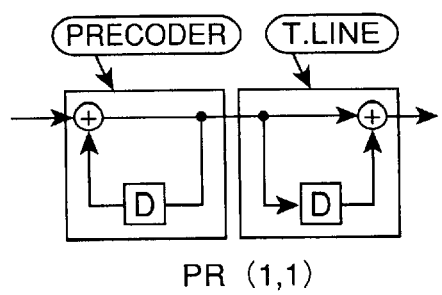
*FIG. 11c*
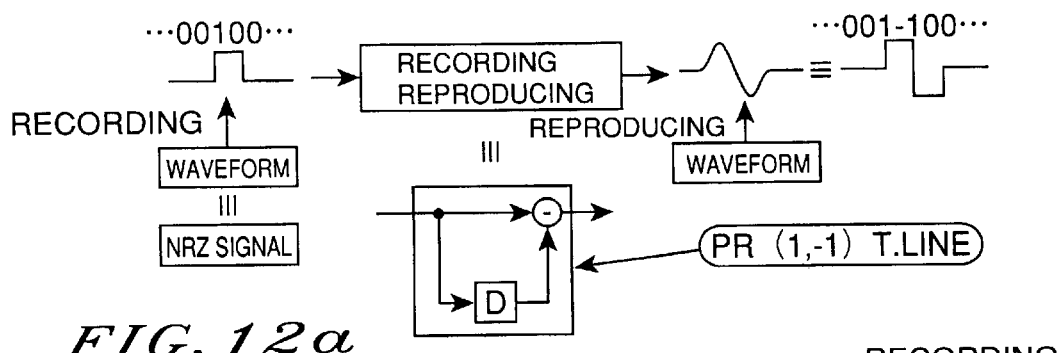
*FIG. 12a*
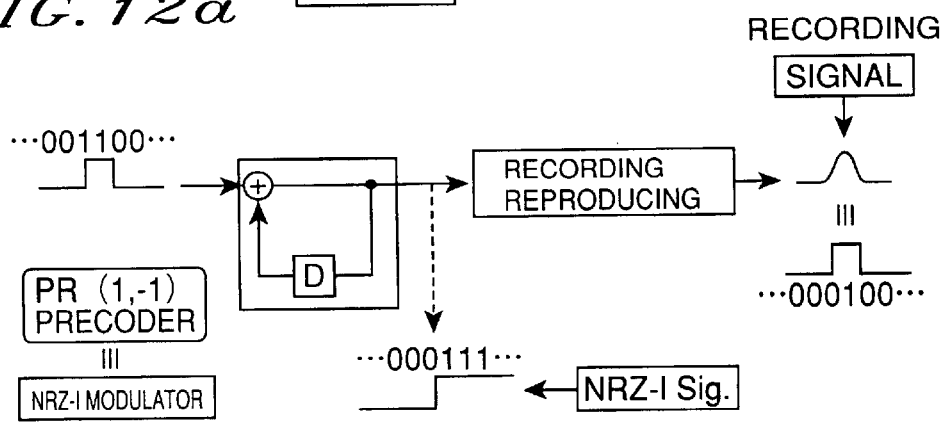
*FIG. 12b*

T.LINE = TRANS-
MISSION LINE

MAGNETIC RECORDING APPARATUS

BACKGROUND OF THE INVENTION

1. Field of the Invention

The present invention relates to a magnetic recording apparatus using a magnetoresistance reproducing head.

2. Description of the Related Art

An MR head using magnetoresistance (MagnetoResistance; hereinafter referred to as MR) is expected as one which can be used for a high density magnetic recording apparatus. The MR head has such a structure that upper and lower magnetic shielding films are disposed above and below a magnetoresistance element through magnetic gap films, respectively. The MR head is stacked with an induction type recording head using the upper magnetic shielding film as its lower recording magnetic pole, and this stacked head is known as a recording/reproduction composite magnetic head.

FIG. 15 is a side view of a medium facing surface: ABS (Air Baring Surface), which shows the structure of a conventional recording/reproduction composite magnetic head. As shown in FIG. 15, an MR film 4 is formed through a lower magnetic gap film 3 of an alumina film or the like on a lower magnetic shielding film 2 of CoZrNb amorphous alloy, or the like, formed on a substrate 1 of altic ($Al_2O_3 \cdot TiC$) with alumina.

The MR film 4 is patterned in stripe shape, and as shown in FIG. 15, a pair of lead electrodes 5 are connected to both ends thereof. The lead electrodes 5 are made of good conductive films with a thickness of about 100 nm. As shown in FIG. 15, an upper magnetic shielding film 8 is formed through an upper magnetic gap film 7 on an MR element 6 including the MR film 4 and the lead electrodes 5. A reproducing MR head 9 is constituted by the MR element 6, the upper and lower gap films 3 and 7, and the upper and lower magnetic shielding films 2 and 8.

An induction type recording head 10 includes, as shown in FIG. 15, a recording magnetic pole serving also as the upper magnetic shielding film 8, a recording magnetic gap film 11 made of an alumina film or the like, and an upper recording magnetic pole 12, and further includes a recording coil (not shown) for applying a recording magnetic field to the recording magnetic poles 8 and 12 at the rear of the ABS.

The increase of recording density of a magnetic recording apparatus, such as a HDD, has been achieved by narrowing a track, narrowing a gap, shortening a bit length of a recording signal, or the like. For example, for the purpose of achieving the high recording density such as 4 Gbpsi (Gigabits/inch$^2$), in addition to shortening of a track width, it is necessary to shorten a bit length by making a reproducing gap length between the upper and lower magnetic shielding films 2 and 8 (distance from the film thickness center of the magnetic field detecting film to the upper and lower magnetic shielding films) to have a length of about 160 nm. For the purpose of achieving such a narrow gap, it is necessary to provide stable insulation coating on the lead electrodes 5 having a thickness of about 100 nm while using the thin upper magnetic gap film 7 having a thickness of about 60 nm at one side.

In the present film forming technique, it is difficult to achieve high recording density such as 10 Gbpsi or more and to secure excellent insulation between the lead electrodes 5 and the upper magnetic shielding film 8.

In addition, the width of an isolated reproduction signal as an index of a reproduction resolution is 280 nm even in the present level of about 4 Gbpsi, and its fluctuation is about 70 nm. For such a width of an isolated reproduction wave output, a desirable gap length becomes almost zero.

On the other hand, Japanese Patent Unexamined Publication No. Hei. 9-138918 discloses an MR head in which an operation point is adjusted by making upper and lower gap lengths different from each other.

As described above, in a conventional magnetic recording apparatus, it becomes difficult to realize a gap length meeting a high recording density system such as 10 Gbpsi or more.

SUMMARY OF THE INVENTION

The present invention has been made to solve such problems, and an object of the invention is to provide a magnetic recording apparatus which meets the increase of recording density and can perform signal reproduction with high accuracy while using an MR head with upper and lower gap lengths different from each other.

In order to solve the foregoing problems, according to a first aspect of the invention, a magnetic recording apparatus comprises a magnetic recording medium having a plurality of recording bits; a magnetoresistance head for detecting a signal magnetic field from the magnetic recording medium, the magnetoresistance head including a magnetic field detecting film, and upper and lower magnetic shielding films provided above and below the magnetic field detecting film through upper and lower magnetic gap films, a distance between the upper magnetic shielding film and a film thickness center of the magnetic field detecting film being different from a distance between the lower magnetic shielding film and the film center; and a signal processing circuit for processing an electric signal from the magnetoresistance head, the signal processing circuit obtaining a reproduction signal of a present bit by subtracting a correction value obtained by multiplying a signal value of a bit prior to the present bit by a predetermined coefficient from a signal value of the bit as a present identification object.

Moreover, in order to solve the foregoing problems, according to a second aspect of the invention, a magnetic recording apparatus comprises a magnetic recording medium with a plurality of recording bits; a magnetoresistance head for detecting a signal magnetic field from the magnetic recording medium, the magnetoresistance head including a magnetic field detecting film, and upper and lower magnetic shielding films provided above and below the magnetic field detecting film through upper and lower magnetic gap films, a distance between the upper magnetic shielding film and a film thickness center of the magnetic field detecting film being different from a distance between the lower magnetic shielding film and the film thickness center; and a signal processing circuit for processing an electric signal from the magnetoresistance head, the signal processing circuit using a partial response system.

The first and second aspects of the invention adopt the magnetoresistance head using the upper and lower magnetic gap films which have the distances from the film thickness center of the magnetic field detecting film being different from each other, so that it is possible to control the increase of an S/N ratio due to an inflow magnetic field from another bit adjacent to the present bit.

That is, since the magnetoresistance head of each of the first and second aspects of the invention has asymmetric gaps, that is, the upper and lower magnetic gap films having the distances from the film thickness center of the magnetic field detecting film being different from each other. Thus, at a wider gap side, that is, at a side where the distance from the film thickness center of the magnetic field detecting film is farther between the upper and lower magnetic shielding films, the inflow magnetic field from the adjacent bit is added, as a noise component, to a signal magnetic field from the present bit, so that the electric signal of the magnetoresistance head detecting this is degraded in S/N ratio, unlike actual recorded information of the present bit, which has been clarified by diligent studies of the present inventors. The magnetic recording apparatus of each of the first and second aspects of the invention adopts the signal processing circuit capable of suppressing the noise component, so that it becomes possible to obtain a reproduction signal with a high S/N ratio.

A recording bit length is fitted to the narrow gap positioned at the opposite side to the wide gap side of the magnetoresistance head of each of the first and second aspects of the invention, and signal reproduction with high density in a track length direction can be made.

Besides, it is preferable to adopt the following in the first aspect of the invention.

1) A predetermined signal is written prior to a data block of the magnetic recording medium.

2) The signal processing circuit obtains the reproduction signal of the present bit by subtracting the correction value obtained by multiplying the signal values of a plurality of bits prior to the present bit by the predetermined coefficient from the signal value of the present bit.

Besides, it is preferable to adopt the following in the first and second aspects of the invention.

3) In the upper and lower magnetic shielding films, the shielding film positioned at a farther place from the film thickness center of the magnetic field detecting film is disposed at an outflow side of the magnetic recording medium.

4) The thicknesses of the upper and lower magnetic gap films are different from each other, and the magnetoresistance head includes an electrode electrically connected to the magnetic field detecting film and positioned at the side of the thicker gap film of the upper and lower magnetic gap films.

5) The magnetoresistance head includes two ferromagnetic films and a nonmagnetic film inserted therebetween, the magnetization directions of both the ferromagnetic films cross each other at right angles, one of the ferromagnetic films is a fixed film in which the magnetization direction is fixed even in a signal magnetic field, and the other ferromagnetic film is a magnetic field detecting film in which the magnetization direction is changed by receiving the signal magnetic field. The sandwich structure in which the nonmagnetic film is sandwiched between the two ferromagnetic films is a so-called spin valve film disclosed in U.S. Pat. No. 5,206,590

BRIEF DESCRIPTION OF THE DRAWINGS

FIG. 9 is a side view of another recording/reproduction composite magnetic head of the first embodiment.

FIGS. 11(a) to 11(c) are views showing ways of thinking a partial response system.

FIGS. 12(a) and 12(b) are views for explaining an NRZ-I system and a PR(1,−1) system.

DETAILED DESCRIPTION OF THE PREFERRED EMBODIMENTS

Preferred embodiments of the present invention will now be described below.

(First Embodiment)

Figure 1:
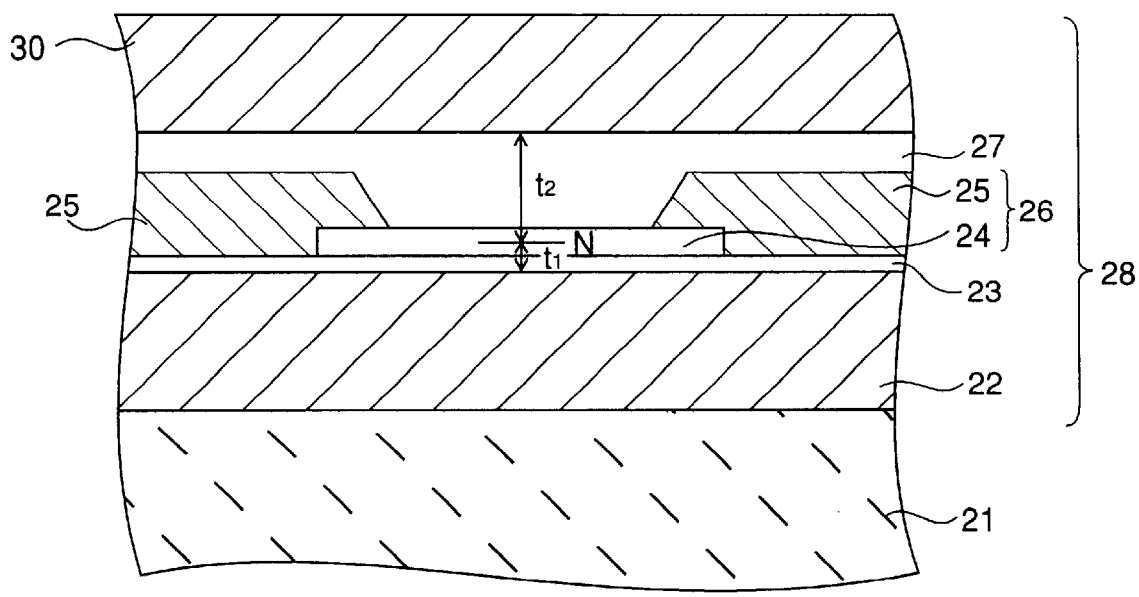
FIG. 1 is a side view showing the structure of an MR head according to a first embodiment of the invention.

First, features of an MR head with asymmetric gaps according to the present invention will be described with reference to FIG. 1. FIG. 1 is a side view of an ABS. FIG. 1 is equivalent to a sectional view in which a protective layer of a head, which has a thin protective layer or the like formed on the ABS, is removed.

In FIG. 1, reference numeral 21 denotes a substrate, such as a substrate of attic with alumina, and a magnetic shielding film 22 made of soft magnetic material such as NiFe alloy or CoZrNb amorphous alloy and having a thickness of about 1 to 2 $\mu$m is formed on the substrate 21.

As shown in FIG. 1, a lower magnetic gap film 23 made of nonmagnetic insulating material such as $AlO_x$ or $SiO_x$ is formed on the lower magnetic shielding film 22. It is ideal that this lower magnetic gap film 23 is a thin film as the film determines a gap length. Since the lower magnetic film is formed on the lower magnetic shielding film 22 having a flat surface, it can sufficiently keep insulation between the lower magnetic shielding film 22 and a magnetoresistance film 24 formed on the lower magnetic gap film 23 though it is thin. Thus, both effects of a narrow gap and stable insulation can be obtained at the same time.

The magnetoresistance film (MR film) 24 is formed on the lower magnetic gap film 23. Although the MR film 24 has a shape such as a rectangle or a square, in the case of the rectangle, the MR film is formed so that its longitudinal direction is substantially in parallel with the ABS.

As shown in FIG. 1, a pair of electrodes 25 supplying a sense current to the MR film 24 and made of a good conductive film are formed on the MR film 24. An MR element 26 is constituted by the MR film 24 and the pair of electrodes 25. An upper magnetic gap film 27 is formed, as shown in FIG. 1, on the MR film 24 and the electrodes 25. Since the lower gap film has the function to determine the gap length, the thickness of the upper gap film can be set at such a thickness that steps formed by the electrodes 25 can be sufficiently covered. Thus, the upper gap film functions as an insulation protective film for excellently insulating the electrodes 25 from an upper magnetic shielding film 30. Incidentally, although the explanation has been made on the example of the steps formed by the electrodes 25, even in the case of a step formed by a hard bias film or other structural elements, the function of the insulating protective film can be expected similarly to the case of the electrode.

As the MR film 24, an anisotropic magnetoresistance film (Anisotropic MR film) or a giant magnetoresistance film (Giant MR film) is used. The AMR film itself is a magnetic field detecting film. In the GMR film, among a plurality of ferromagnetic films, a ferromagnetic film in which the magnetization direction is changed according to a signal magnetic field from a magnetic recording medium, is a magnetic field detecting film. In the case where the GMR film includes a plurality of ferromagnetic films in which the magnetization directions are responsive to the signal magnetic field, the plurality of ferromagnetic films from the lowermost layer to the uppermost layer are made magnetic field detecting films. Thus, the film thickness center is a film thickness center of the ferromagnetic films from the lowermost layer to the uppermost layer. In the plurality of ferromagnetic films, there is a case where they are stacked while they are in contact with each other, and a case where they are stacked while a nonmagnetic film is inserted therebetween. In the GMR film having the inserted nonmagnetic film, the film thickness center is obtained after paying consideration to the inserted nonmagnetic film as well.

When the AMR film in which the entire of the MR film 24 is a magnetic field detecting film is used, a distance (lower gap length) t1 from a film thickness center N to the lower magnetic shielding film 22 and a distance (upper gap length) t2 from the film thickness center N to the upper magnetic shielding film 30 have a relation of t1<t2, so that the films have an asymmetric gap structure in which the upper and lower gap lengths are asymmetric.

The AMR film is a magnetic field detecting film made of ferromagnetic film material such as $Ni_{80}Fe_{20}$, and is a film in which the electric resistance is changed depending on the relative angle between its own magnetization moment corresponding to the detected signal magnetic field and the direction of a current flowing in the film. In the GMR film, there are giant magnetoresistance films (GMR films) including a spin valve film, an artificial lattice film, a ferromagnetic tunnel contact film and the like, which are preferable in achieving high density recording.

The spin valve film is made of a magnetic multilayer film of a laminate including a magnetic field detecting film in which its magnetization direction is changed by an external magnetic field, a nonmagnetic conductive film, a magnetization fixed film, and an antiferromagnetic film. In the spin valve film, its electric resistance is changed depending on the magnetization relative angle between the magnetic field detecting film and the magnetization fixed film. In the case of such a spin valve GMR film, a hard magnetic film or antiferromagnetic film applying a bias magnetic field to the magnetic field detecting film is disposed as the need arises. The magnetic field detecting film and the magnetization fixed film are respectively made of a ferromagnetic layer made of Co, CoFe alloy, CoFeB alloy, NiFe alloy, CoNi alloy, NiFeCo alloy, or the like. Especially the magnetic field detecting film may be made of a plurality of layers using different materials, and in the case of using Co or Co alloy, it is preferable to make a laminate with a soft magnetic material made of NiFe alloy or the like.

When the narrow lower magnetic gap length t1 disposed at the lower side of the MR film 24 is specified as a reproduction magnetic gap on a signal reproducing process, the MR head becomes a head structure suitable for narrowing a gap. Moreover, it becomes possible to increase the density in a magnetic recording apparatus using this MR head.

Next, a manufacturing method of the foregoing MR head 28, and insulation protective resistance of an end portion of an electrode will be described.

First, an alumina insulating film (not shown) with a thickness of about 10 μm is formed as an under film on an attic substrate. A CoZrNb amorphous alloy film with a thickness of 1.5 μm is formed as the lower magnetic shielding film 22 on the altic substrate 21 by using, for example, a sputtering method.

Next, an alumina film is formed as the reproduction magnetic gap film 23 on the lower magnetic shielding film 22. Since the surface of the lower magnetic shielding film 22 can be sufficiently flattened, it is possible to satisfactorily form even the lower magnetic gap film 23 in which its thickness is made about 30 nm in order to meet recording density such as 10 Gbpsi. Further, it is possible to sufficiently excellently form even the lower magnetic gap film 23 in which its thickness is made about 15 nm in order to meet 40 Gbpsi.

The MR element 26 is formed on the foregoing lower magnetic gap film 23. That is, the MR film 24 and the pair of lead electrodes 25, and further, a bias film according to necessity are formed. The upper magnetic gap film 27 made of a nonmagnetic insulating film is formed as an overcoat layer so as to protect the MR element 26. The upper magnetic gap film 27 can be made to have such a thickness that the electrode 25 having a thickness of about 100 nm can be excellently insulation coated. That is, it is possible to prevent occurrence of a short circuit or the like due to poor insulation of the electrode 25.

In the MR head 28 of this embodiment, the magnetic gap film 23 is disposed at the lower side of the MR element 26, where the film can be formed on the flat surface. Thus, it is possible to make the gap length short correspondingly to narrowing of the gap, and to make the half width of a reproduction signal waveform narrow. On the other hand, the upper gap film 27 covering the electrode 25 having a thickness of 100 nm can be made thicker than the lower magnetic gap 23 so that it is possible to prevent occurrence of poor insulation or the like. Thus, it becomes possible to stably manufacture a reproducing head having such a narrow gap structure that a single side gap length is 30 nm or less, and further, a reproducing head having such a narrow gap structure that a single side gap length is 15 nm or less. Like this, the MR type reproducing head of the asymmetric gap structure of the invention is effective for such a narrow gap structure that a one side gap length is 30 nm or less. In the MR head 28 of the asymmetric gap structure, it was found by the present inventors that as compared with the magnetic shielding film 22 at the narrow gap length side of the MR element 26, a signal magnetic flux is mixed from an adjacent bit corresponding to the magnetic shielding film 30 at the wide gap length side, and the S/N ratio is degraded. With respect to this problem, excellent reproduction characteristics can be obtained by applying a reproducing method (decoding method) of signals described later in detail.

Next, a recording/reproduction composite head will be described with reference to the ABS side view of FIG. 2. As show in FIG. 2, an induction type thin film magnetic head 29 is formed as a recording head on the MR head 28 of the asymmetric gap structure. A lower recording magnetic pole 30 of the induction type magnetic recording head 29 serves also as the upper shielding film and is formed on the insulating film 27. A recording magnetic gap film 31 made of a nonmagnetic insulating material such as $AlO_x$ and an upper recording magnetic pole 32 are sequentially formed on the lower recording magnetic pole 30. A recording coil (not shown) applying a recording magnetic field to the lower recording magnetic pole 30 and the upper recording magnetic pole 32 is disposed at the rear side of the medium facing surface. The thin film magnetic head 29 as a recording head is constituted by these structural elements.

Figure 2:
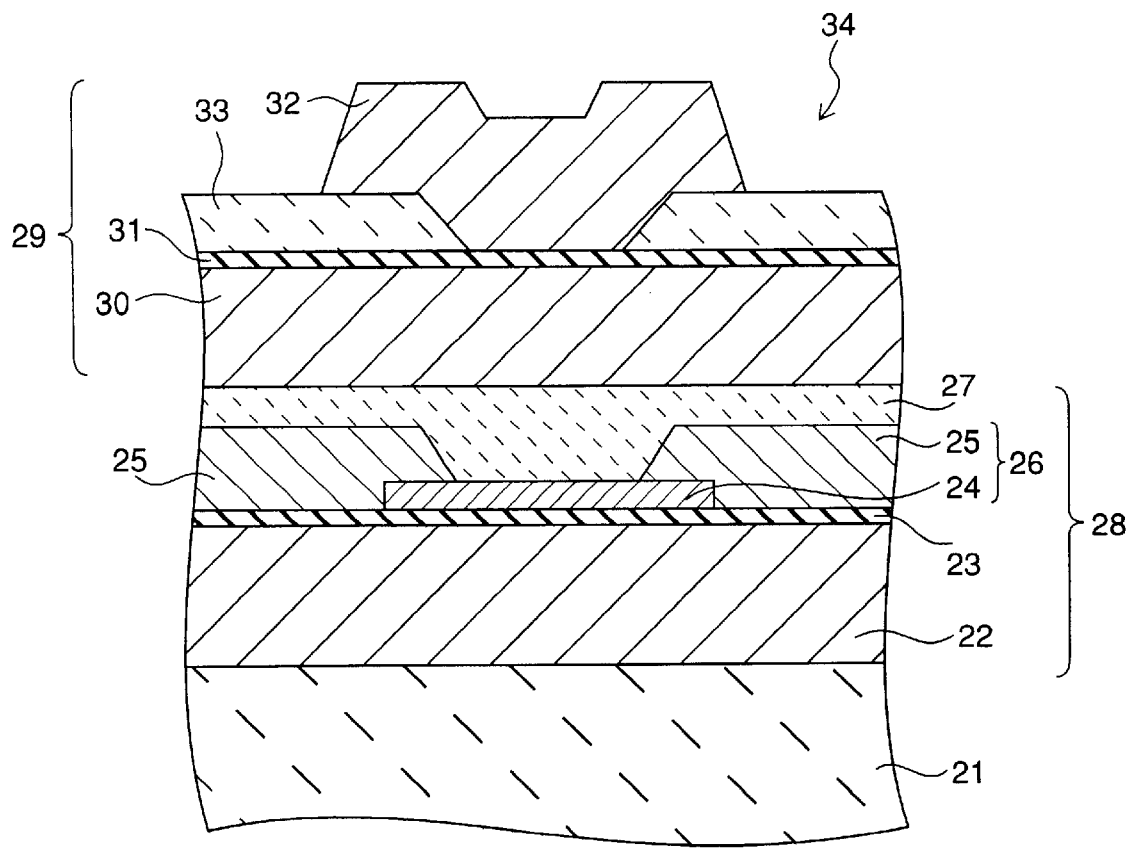
FIG. 2 is a side view of a recording/reproduction composite magnetic head of the invention.

Incidentally, reference numeral 33 in FIG. 2 denotes a $SiO_x$ insulating layer regulating the formation position of the tip portion of the upper recording magnetic pole 32. The tip portion of the magnetic pole of the upper recording magnetic pole 32 is formed in a recess portion provided in the $SiO_x$ insulating layer 33.

Figure 3:
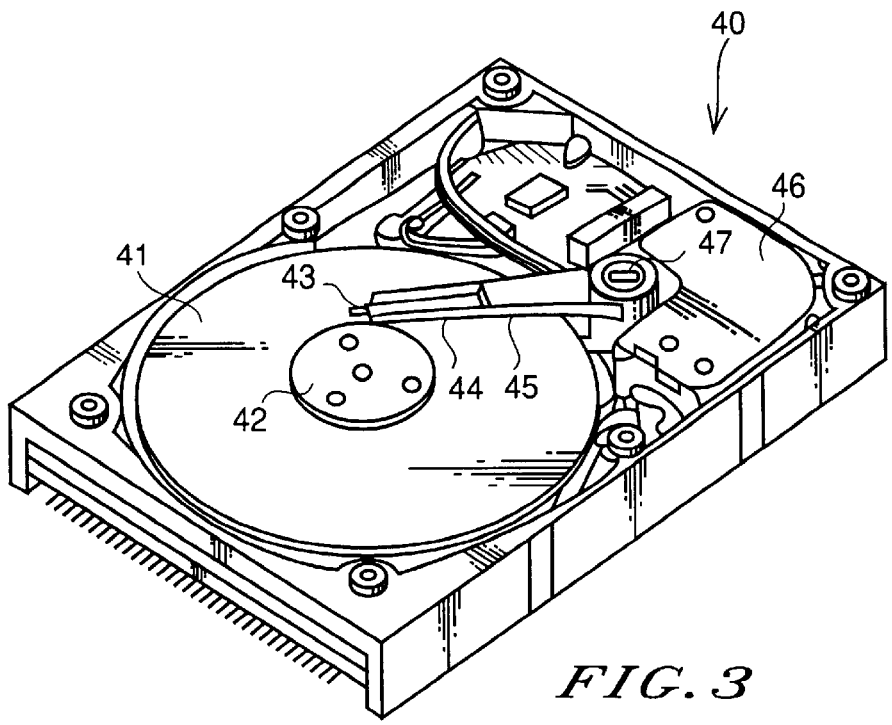
FIG. 3 is a perspective view showing a schematic structure of a magnetic disk apparatus.

A recording/reproduction composite magnetic head 34 is constituted by the asymmetric gap structure MR head 28 as a reproducing head and the induction type magnetic recording head 29 as a recording head. The recording/reproduction composite magnetic head 34 is mounted on a magnetic recording apparatus such as a magnetic disk apparatus as shown in FIG. 3. FIG. 3 is a view showing a schematic structure of a magnetic disk apparatus 40 using a rotary actuator.

As shown in FIG. 3, a magnetic disk 41 is attached to a spindle 42, and is rotated by a not-shown motor responsive to a control signal from a driving apparatus control source (not shown). A head slider 43 is attached to the tip of a plate-like suspension 44. When the magnetic disk is rotated, the medium facing surface (ABS) of the head slider 43 is held with a predetermined floating amount (for example, from 0 to 100 nm) from the surface of the magnetic disk 41. The foregoing recording/reproduction composite magnetic head 34 of the embodiment is mounted on the head slider 44. The head slider 44 performs recording and reproduction of information in the state where it floats over the magnetic disk 41 or is in contact with the magnetic disk.

As shown in FIG. 3, the suspension 44 is connected to one end of an actuator arm 45 including a bobbin portion for holding a driving coil. A voice coil motor 46 as a kind of a linear motor is provided at the other end of the actuator arm 45. The voice coil motor 46 is constituted by a not-shown driving coil wound on the bobbin portion of the actuator arm 45, and a magnetic circuit composed of a permanent magnet and an opposite yoke disposed opposite to the coil so that it is sandwiched therebetween. The actuator 45 is, as shown in FIG. 3, held by not-shown ball bearings provided at upper and lower two portions of a fixed shaft 47, and can be freely rotated and slid by the voice coil motor 46.

In the above described magnetic disk apparatus 40, reproducing signal processing of magnetic recording by use of the recording/reproduction composite magnetic head 34 of the invention is carried out as described below. The reproduction of magnetic record in the magnetic disk apparatus 40 will be described.

Figure 4:
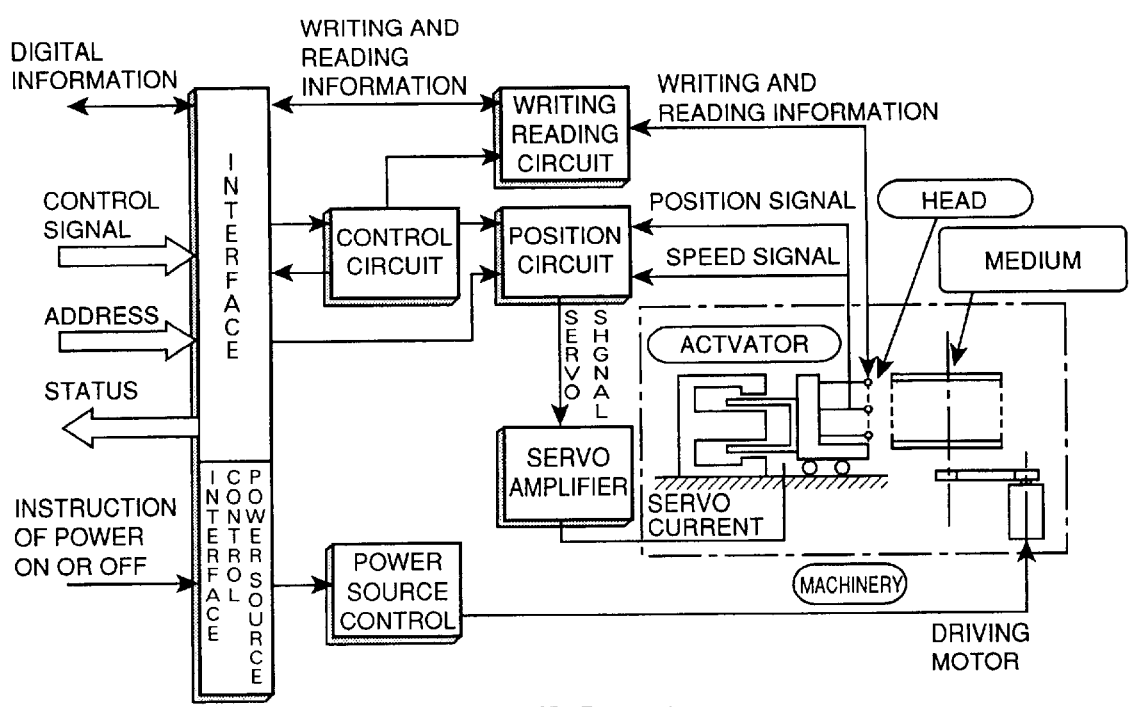
FIG. 4 is a schematic view showing the functional block of the magnetic disk apparatus.
Figure 5:
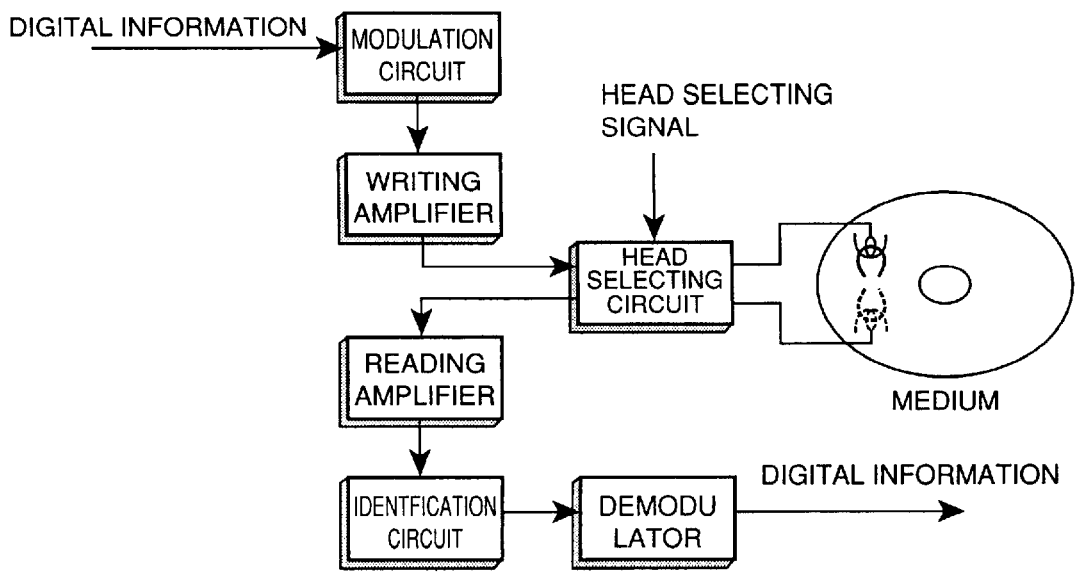
FIG. 5 is a structural view of a recording-reproducing circuit portion of the magnetic disk apparatus.
Figure 6:
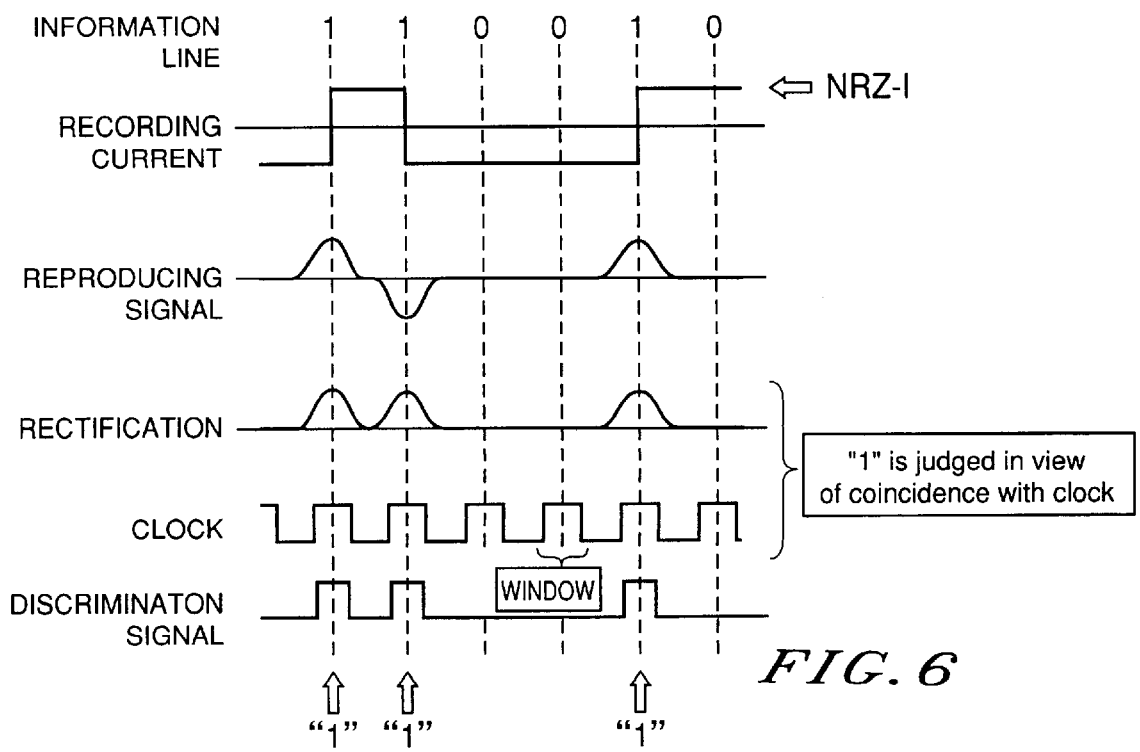
FIG. 6 is a view showing the basis of recording and identification of digital magnetic recording.
Figure 7:
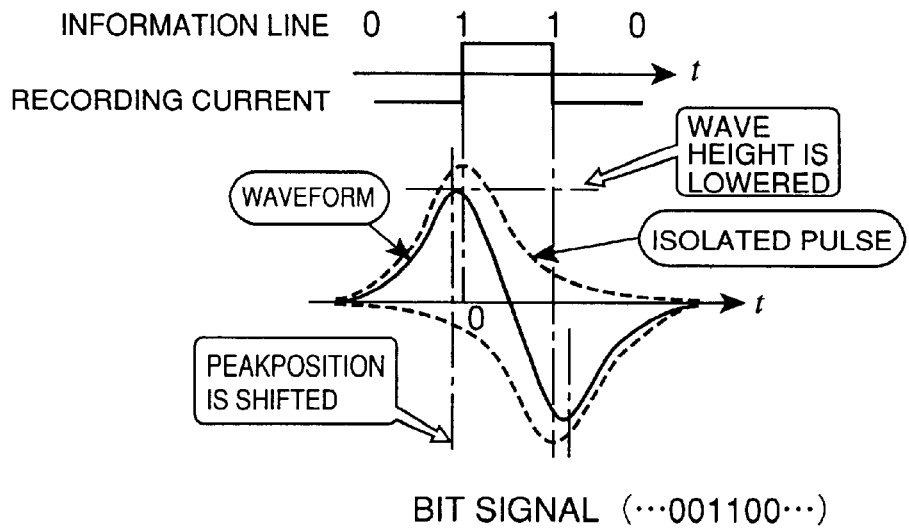
FIG. 7 is a view showing an intersymbol interference due to superimposition of isolated reproduction pulses.

FIG. 4 is a schematic view showing the functional blocks of the magnetic disk apparatus. FIG. 5 shows the structure of a writing and reading circuit portion in FIG. 4. FIG. 6 is a view showing the basic relation between bit information on the magnetic disk and its reproduction signal. In the drawings, an information line is an information line recorded in the magnetic disk. A piece of information is recorded in each bit on the disk, and bit groups are continuously arranged on the disk to constitute a recording track. A recording current is given to a coil when recording is carried out in each bit, and a reproduction signal indicates a reproduction pulse of the recorded information. In the digital magnetic recording, since the reproduction signal becomes a pulse waveform generated when the reproducing head passes through a magnetization inversion portion on the disk, "1" is judged in view of the coincidence of the reproduction pulse and clock. When a detection signal of the MR head of the asymmetric gap structure of the invention is combined by this basic system, an intersymbol interference occurs by an inflow magnetic field from an adjacent bit at the wide gap length side, which becomes a cause of noise. That is, 1) an interval of magnetization inversion becomes short by achievement of the narrow gap length so that a mutual interference occurs between adjacent magnetization inversions, and 2) a reproduction waveform is influenced by an inflow component from the adjacent bit at the wide gap length side. The influence is specifically a lowering of an output peak value and a shift of a peak position (pattern peak shift). FIG. 7 shows a pulse waveform with a solid line in which the intersymbol interference occurs by the pattern peak shift.

Here, in an isolated reproduction pulse as an ideal value, as shown by a dotted line in FIG. 7, the position is in conformity with the end of information and the value of wave height is high. On the other hand, in the reproduction by the MR head of the asymmetric gap structure, by the influence of the above 1) and 2), when only a basic process is carried out without applying a suitable process to a signal, as shown by the solid line in FIG. 7, the value of wave height is lowered and the peak position is shifted from the end of information. Like this, contrary to the actual recorded information of the present pit, the S/N ratio of the signal of the MR head of the asymmetric gap structure is lowered. Then, by using a signal processing method explained by use of FIG. 8, the foregoing pattern peak shift and the lowering of output value are corrected in the invention.

Figure 8:
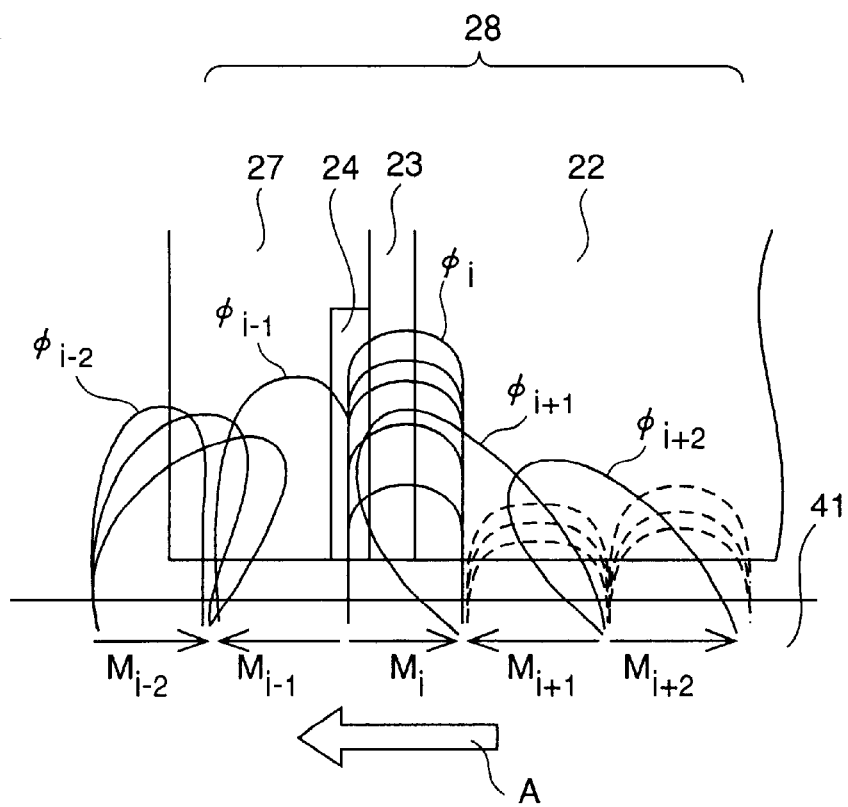
FIG. 8 is a view for explaining a recorded information reproducing process of the first embodiment.

FIG. 8 shows a positional relation between a bit on the magnetic recording medium and the MR head 28. In FIG. 8, the magnetic disk 41 progresses toward the direction of arrow A in the drawing. That is, the magnetic shielding film 22 of the MR head 28 of the asymmetric gap structure is disposed at the inflow side of the magnetic disk 41 as the recording medium. In the drawing, M denotes magnetization of each recording bit on the magnetic disk 41, and $\phi$ denotes signal magnetic flux flowing into the MR head 28 from the magnetization M of each recording bit.

FIG. 8 shows a state in which a bit signal of magnetization Mi on the magnetic disk 41 is decoded and reproduced by the MR head 28. The signal flux is flown into the MR head 28 from not only magnetization Mi of the present bit but also magnetization of adjacent bits.

Among magnetic flux flown into the MR head 28, signal magnetic flux $\phi$ i from the magnetization Mi of the present bit becomes maximum. Signal magnetic flux $\phi_{i-1}$ from magnetization $M_{i-1}$ of the previous bit signal which is not shielded is next largest. Although signal magnetic flux $\phi_{i-1}$ of the magnetization $M_{i-2}$ of the bit signal prior to the previous bit signal is almost zero, the value thereof can not be always neglected. The same can be said of signal magnetic flux from the further previous bit signals.

On the other hand, since the signal magnetic flux $\phi_{i+1}$ from the magnetization $M_{i+1}$ of the next bit is absorbed by the magnetic shielding film 22, it can be almost neglected.

Signal magnetic flux $\phi+2$ from magnetization $M_{i+2}$ of the farther bit signal is almost zero. Thus, the total $\phi_{total}$ of the signal magnetic flux flown into the MR head 28 is roughly expressed by $\phi_{i-2}+\phi_i$. The output V of the MR head 28 on the basis of such magnetic flux $\phi_{total}$ of the present reproduction signal is $$V = V(\phi_{total}) = C(\phi_{total}) \sim C(\phi_{i-2} + \phi_{i-1} + \phi_i).$$

Providing that the magnetization Mj exists at the correct position just under the MR head 28, the output Vj is expressed by $$V_j \sim C(\phi_{j-2} + \phi_{j-1} + \phi_j) = C(k_{-2}M_{j-2} + k_{-1}M_{j-1} + k_0 M_j).$$

Further, next reproduction output $V_{j+1}$ is expressed by $$V_{j+1} \sim + C(k_{-2}M_{j-1} + k_{-1}M_j + k_0 M_{j+1}).$$

Although each of $k_{-2}$, $k_{-1}$, and $k_0$ is a coefficient and is changed by the value of magnetization M of each bit, each can be roughly made a constant on the basis of the position from the present bit $M_j$. Thus, the signal of the present bit Mj can be read by subtracting a value obtained by multiplying a plurality of previous bit signals (here, $M_{j-2}$ and $M_{j-1}$) by predetermined coefficients ($k_{-2}$ $k_{-1}$) from the present reproduction signal.

That is, the output Vj ($\sim Ck_0 M_j$) based on only the magnetic flux $\phi_j$ ($\sim (k_0 M_j)$) from the present bit Mj can be obtained in the way described below. First, prior to the data block of the magnetic disk 41, other than the data signal, signals (for example, M1, M2, M3, M4) with known M magnetization are written into a plurality of bits. At this time, it is assumed that a signal is not recorded prior to the magnetization M1.

In such a state, output V1 when the magnetization M1 is the present bit, similarly, output V2, V3, V4, V5 . . . when the magnetization M2, M3, M4, M5 . . . are the present bit, are expressed as follows.

$$V1 \sim C(k_0 M_1)$$

$$V2 \sim C(k_{-1}M_1 + k_0 M_2)$$

$$V3 \sim C(k_{-2}M_1 + k_{-1}M_2 + k_0 M_3)$$

$$V4 \sim C(k_{-2}M_2 + k_{-1}M_3 k_0 M_4)$$

$$V5 \sim C(k_{-2}M_3 + k_{-1}M_4 + k_0 M_5)$$

Here, since the magnetization $M_1$ to magnetization $M_4$ are known values different from the data signal, when $K_{-2}M_3$ and $k_{-1}M_4$ is subtracted from the output V5, the value of the magnetization $M_5$ can be obtained. The output V6 of the magnetization $M_6$ of the next bit signal is expressed as follow.

$$V6 \sim C(k_{-2}M_4 + k_{-1}M_5 + k_0 M_6).$$

In this case, the magnetization $M_4$ is a known value, and the magnetization $M_5$ is an already obtained value, so that if these values are stored and are subtracted from the output V6, the magnetization $M_6$ is obtained. The magnetization $M_7$ and the following can also be obtained in the same way.

That is, since the magnetization $M_{j-1}, M_{j-2}$ . . . prior to the present bit (magnetization Mj), in other words, the magnetization $M_{j-1}, M_{j-2}$ . . . positioned at the side of the insulating film 27 viewed from the present bit Mj, which are not shielded, are known, the magnetization Mj of the present bit can be obtained by subtracting them from the output (present reproduction output) based on the total signal magnetic flux $\phi_{total}$ flown into the MR head 28.

Like this, when the magnetic shielding film 22 at the narrow gap side is disposed at the inflow side of the magnetic disk 41, and the signal of the present bit is read by subtracting a value obtained by multiplying signals of a plurality of previous bits by predetermined coefficients from the present reproduction signal, it becomes possible to realize decoding-reproduction of the recording signal with a high S/N ratio by using the MR head 28 of the asymmetric gap structure. That is, the signal of the present bit can be decoded with high accuracy from the present reproduction signal. At that time, prior to the data block, signals (for example, M1, M2, M3, M4) with known magnetization M are written other than the data signal, so that the accuracy of decoding of the present bit can be improved. Further, since shortening of a gap length by use of the MR head 28 of the asymmetric gap structure corresponds to shortening of a bit length, the invention is also effective for improvement of a signal transmission speed, improvement of recording density, and the like.

Next, another example of the MR head 34 of the asymmetric gap structure shown in FIG. 1 will be described with reference to FIG. 9.

As shown in FIG. 9, it is possible to form a lower reproduction magnetic gap film 53 with a thickness of 30 nm or less with excellent accuracy by forming it on a flat magnetic shielding film 52. That is, for example, even the reproducing magnetic gap film 53 with a thickness of about 30 nm corresponding to 10 bpsi, and even the reproducing magnetic gap film 53 with a thickness of about 15 nm corresponding to 40 Gbpsi, can be formed excellently.

Similarly to the foregoing embodiment, as shown in FIG. 9, an MR element 56 including an MR film 54 and a pair of lead electrodes 55 is formed on the lower reproducing magnetic gap film 53. An upper reproducing magnetic gap film 57 is formed on the MR element 56. The upper reproducing magnetic gap film 57 is formed, as shown in FIG. 9, to have a thickness not less than twice the lower reproducing magnetic gap film 53 in order to make excellent insulation coating of the lead electrodes 55 having a thickness of about 100 nm. Like this, by forming the upper reproducing magnetic gap film 57 of a thick nonmagnetic insulating film, it is possible to prevent occurrence of a short circuit or the like due to poor insulation of the lead electrodes 55.

We made experimental data to find the minimum upper gap film thickness needed to insulate spin-valve element having leads from the upper shielding film. The result told that more than twice of lower gap thickness was must for the insulation. We confirmed that due to lack of step coverage of the upper gap film over the leads and the spin-valve, deposited upper gap thickness on both edges of the leads was thinner than on spin-valve. Therefore, more than twice of the lower gap thickness is needed.

We made other experimental data using different sputtering machines. Some had better gap quality to insulate and the other had worse. However the minimum upper gap thickness needed to insulate was twice of the lower gap thickness regardless machines to be used. For example, using good machine 30 nm was minimum thickness for the lower gap to insulate from the bottom shielding film, 65 nm was the minimum thickness for upper gap to insulate from the upper shielding film. Using bad machine, 70 nm was minimum thickness for the lower gap to insulate from the bottom shielding film, 145 nm was the minimum thickness for the upper gap film to insulate from the upper shielding film.

Figure 16:
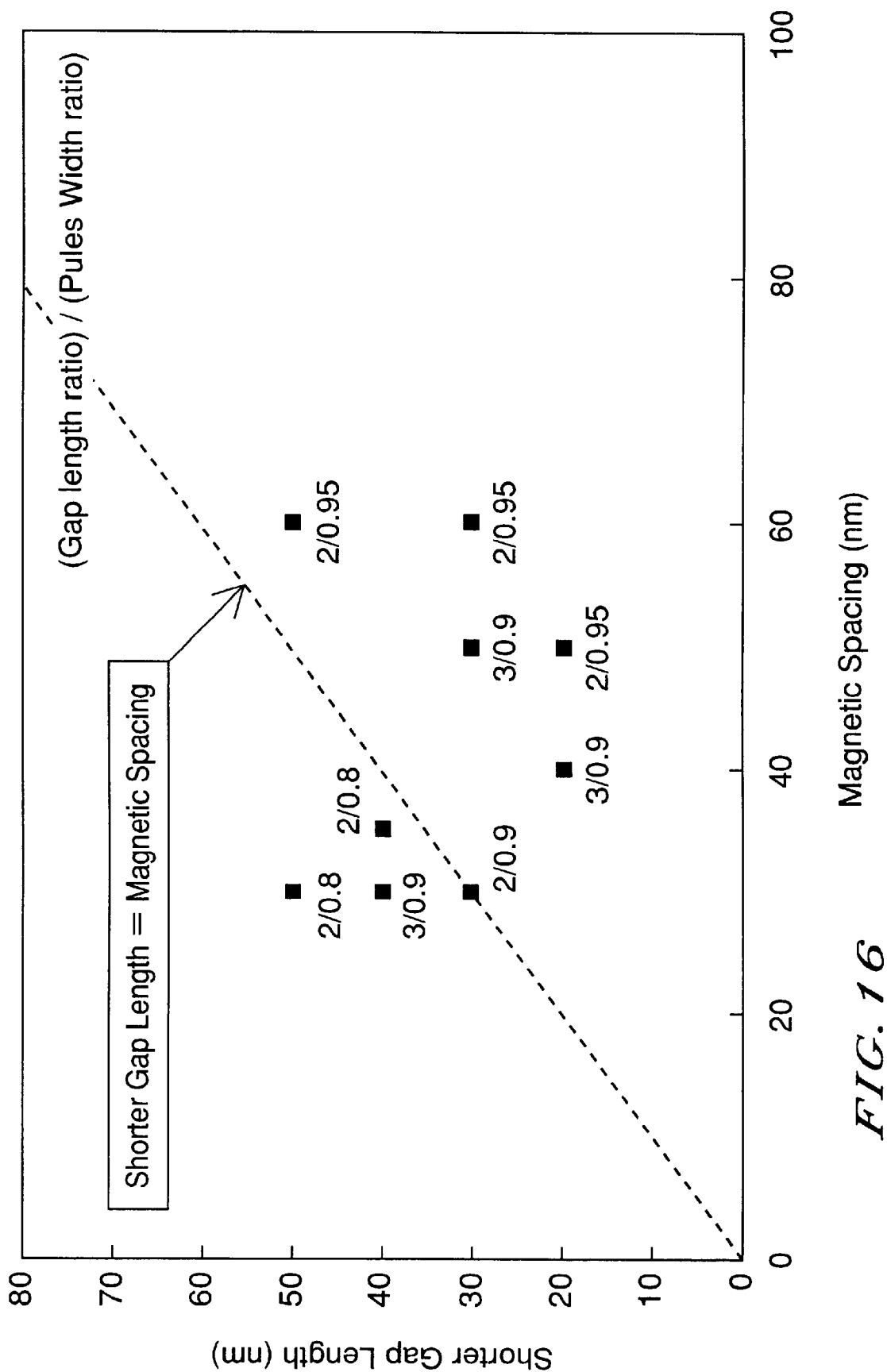
FIG. 16 is a graph showing magnetic spacing versus gap length.

We made experimental data to find HDD system solution to obtain good asymmetry of left and right halfs of half width value of a reproducing signal wave with varying gap length of shorter one of upper and lower gap length and magnetic spacing, as shown in FIG. 16. The upper and lower gap length are distance between a film thickness center of the field detecting film of the magnetic reproducing head and corresponding one of the upper and lower magnetic shielding film of the magnetic reproducing head. The shorter gap length of FIG. 16 is one of shorter than the another. Magnetic spacing is distance between the medium facing surface of the magnetic field detecting film of the magnetic reproducing head and surface of recording film of the magnetic recording medium. The dotted line of the FIG. 16 shows that the shorter gap length is equal to the magnetic spacing. Each of the 9 points shows (gap length ratio)/(pulse width ratio). The gap length ration is equal to (gap length of shorter one)/(gap length of longer one), for example t2/t1 shown in FIG. 1. The pulse width ratio is (width of narrower one of the right and left half of the half width of a reproducing signal wave)/(width of another of the right and left of the half width of a reproducing signal wave). It is clear that if lower gap thickness is less than the spacing, good symmetrical wave shape (better than 0.9 which is manageable asymmetry for HDD system) is obtainable even with asymmetrical gap. This is a completely new invention. In no conventional HDD, lower gap thickness has been less than the magnetic spacing.

As shown in FIG. 9, an upper magnetic shielding film 58 is formed on the upper reproducing magnetic gap film 57, and an MR head 59 of the asymmetric gap structure is constituted by these. The MR head 59 of the asymmetric gap structure functions as a reproducing head.

As shown in FIG. 9, an induction type thin film magnetic head 60 is formed as a recording head on the MR head 59 of the asymmetric gap structure. A lower recording magnetic pole of the induction type magnetic recording head 60 is formed of the common magnetic material to the upper magnetic shielding film 58 of the MR head 59. A recording magnetic gap film 61 made of a nonmagnetic insulating material such as $AlO_x$ and an upper recording magnetic pole 62 are sequentially formed on the lower recording magnetic pole 58 serving also as the upper magnetic shielding film. A recording coil (not shown) applying a recording magnetic flux to the lower recording magnetic pole 58 and the upper recording magnetic pole 62 is disposed at the rear side of the medium facing surface. The induction type magnetic recording head 60 as a recording head is constituted by these respective structural elements. Incidentally, reference numeral 63 in the drawing denotes an $SiO_x$ insulating layer.

Figure 10:
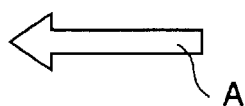
FIG. 10 is a view for explaining a reproducing signal process of a recorded information reproducing apparatus using the magnetic head shown in FIG. 9.

Also in the reproduction of a recording signal by use of the MR head 59 of the asymmetric shield type, similarly to the asymmetric gap structure MR head 34, there is a great fear that a signal magnetic flux is mixed from adjacent bits and an S/N ratio is lowered. In such a case as well, as shown in FIG. 10, when the lower reproducing magnetic gap film 53 constituting a substantial gap of the MR head 59 is disposed at the inflow side of the magnetic disk 41, and a value obtained by multiplying a plurality of previous bit signals ($M_{i-2}$, $M_{i-1}$) by predetermined coefficients ($k_{-2}$, $k_{-1}$) is subtracted from the present reproduction signal, the signal Mi of the present bit can be read with high accuracy.

A specific decoding-reproducing method of recording signals is the same as the foregoing embodiment, and the same can be said of the method that signals with known magnetization M, other than data signals, are written prior to a data block.

By applying such a reproducing method of the recording signal, it becomes possible to realize decoding-reproduction of the recording signal with a high S/N ratio by the MR head 59 of the asymmetric shielding type. That is, the signal of the present bit can be decoded with high accuracy from the present reproduction signal. At that time, prior to the data block, signals with known magnetization, other than the data signal, are written, so that accuracy of decoding of the present bit can be improved. In addition, since influence from previous bit signals (for example, $M_{i-3}$ or $M_{i-2}$) can be lessened by the upper magnetic shielding film 58, the signal of the present bit can be decoded more accurately.

(Second embodiment)

In this embodiment, a signal processing method by a partial response system suitable for the magnetic recording apparatus using the MR head of the asymmetric gap structure will be described. Although the signal processing method explained in the first embodiment has the basis that the intersymbol interference of reproduction signals using the MR head of the asymmetric gap structure is removed, the partial response (PR) system is a digital transmission system which actively uses the intersymbol interference. That is, in the PR system, decoding of information is not carried out by the peak position, but is carried out by the level of the reproduction signal. Actually, arithmetic processing of recording signals is carried out prior to recording so that waveforms are positively interfered, and at the reproduction as well, arithmetic processing of reproduction signals is carried out to decode. There are various kinds of calculation methods of the PR system. The calculation can be set so that the frequency band region of the result of calculation can be restricted, the SN ratio can be made high as compared with the peak detection, and the error rate can be made an excellent value.

First, in the partial response system, as an equivalent to obtain information of . . . 00100 . . . , equating is made to . . . 001100 . . . or . . . 0012100 . . . as shown in FIG. 11(a), so that the SN ratio is improved.

An equivalent circuit diagram of a transmission line of . . . 001100 . . . in FIG. 11(a) is as shown in FIG. 12(a). PR(1,1) is an equivalent system of . . . 001100 . . . . An equivalent of . . . 0012100 . . . is called (1,2,1) equivalent. A decoder the equivalent circuit of which is shown in FIG. 11 (b) is required to decode the output of FIG. 11(a). If there is an error in the transmission line, there is a fear that the error influences the decoding circuit. Against this, a combining unit is inserted as a precoder at the front stage of the transmission line. Such a transmission line is contained in a modulation circuit prior to a writing amplification stage shown in FIG. 5, and a decoding circuit is contained in a demodulation circuit prior to an identification circuit.

Figure 13A:
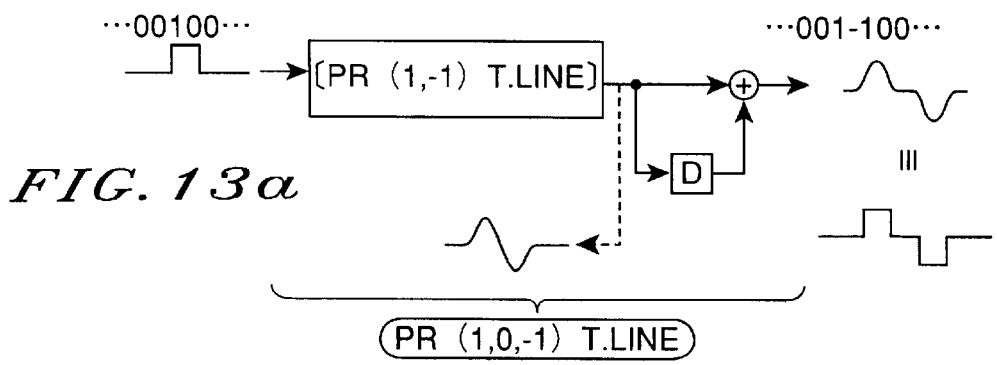
FIGS. 13(a) and 13(b) are views for explaining an I-NRZ-I system and a PR(1, 0, −1) system.
Figure 13B:
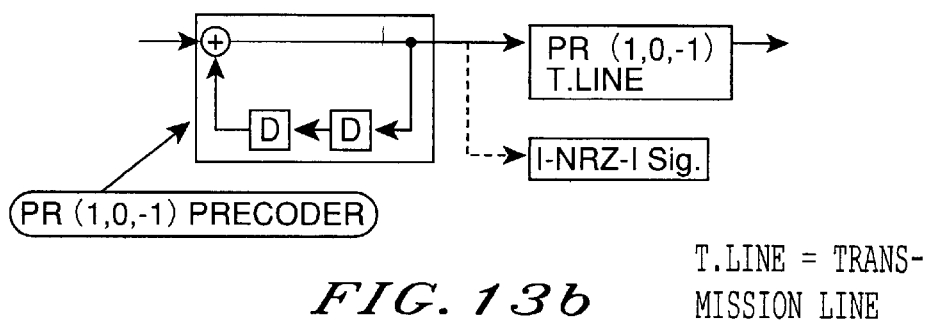

Since the recording and reproduction of the PR system has a differential characteristic as in FIG. 12(a), the input of . . . 00100 . . . is outputted as . . . 001–100 . . . , which can be regarded as a PR(1–1) system. The precoder of this PR(1,–1) system is shown in FIG. 12(b), and its output is an NRZ-I signal. Here, to actively use the feature of equating to . . . 00100 . . . , as shown in FIG. 13(a), when the PR(1,1) transmission line is inserted prior to an identification point, since the input of . . . 00100 . . . is outputted as . . . 010–10 . . . , the transmission line with dependent PR(1,–1) and PR(1,1) is a PR(1,0,–1) transmission line. By the structure of the precoder as shown in FIG. 13(b), 2-bit delay of output and operation of sum of mod2 of input is carried out. This precoder is an I-NRZ-I demodulator which is one of the partial response systems, and the output is the I-NRZ-I signal.

Figure 14:
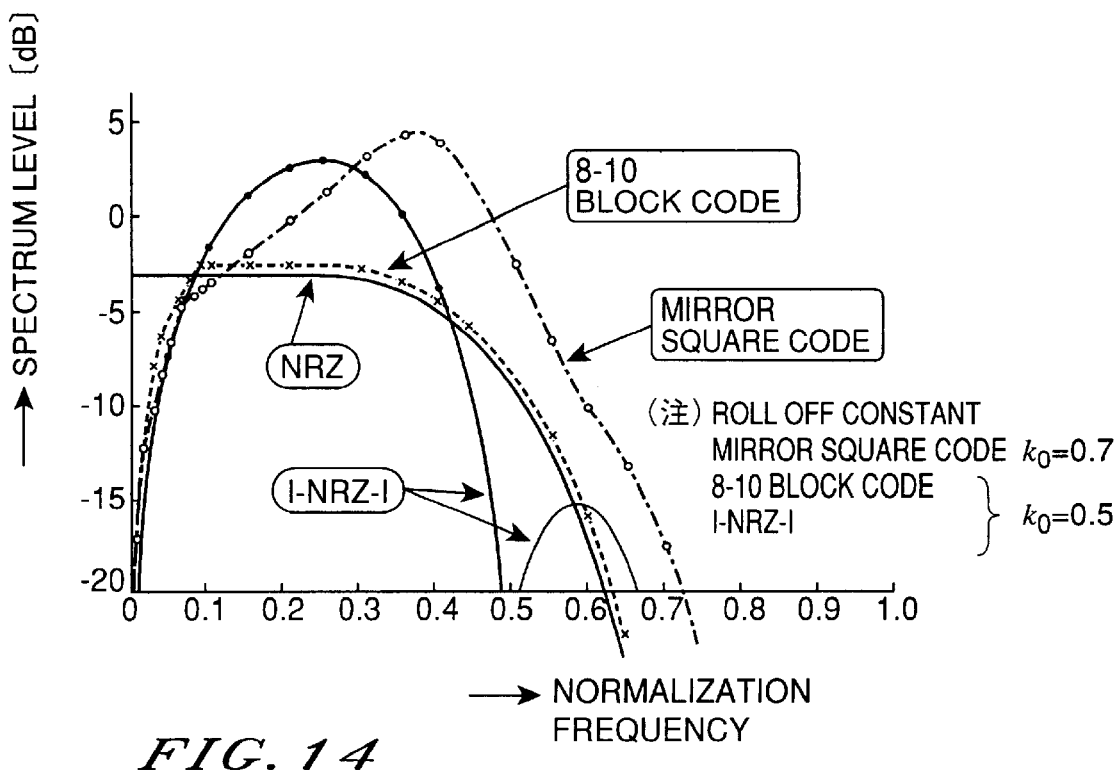
FIG. 14 is a view showing the spectrum of respective identification signals.
Figure 15:
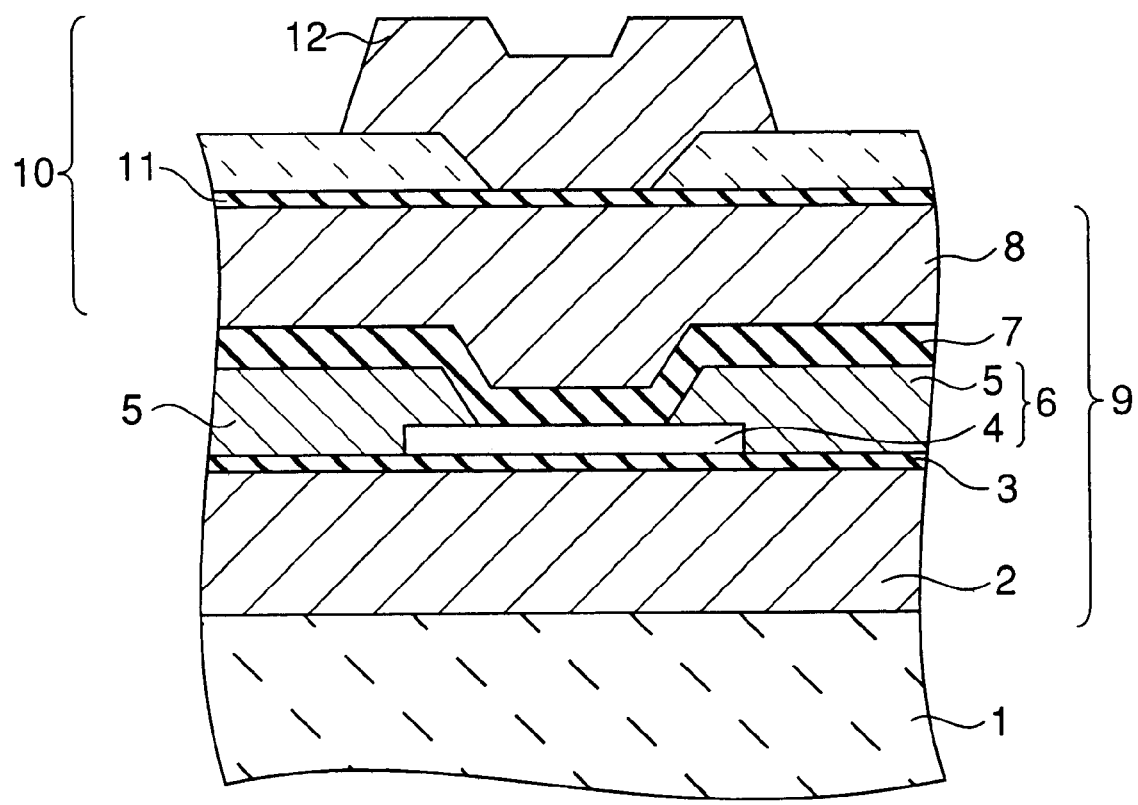
FIG. 15 is a side view showing a conventional magnetoresistance head.

When such a recording signal that the SN ratio of the signal at the identification time becomes as high as possible, is considered, it is desirable that the spectrum of the identification signal is approximate to the frequency characteristics of a recording and reproduction system. As shown in FIG. 14, the spectrum of the I-NRZ-I system is approximate to the frequency characteristic of the magnetic recording and reproducing system, has few high region components, and has no direct current component, so that the SN ratio to machine noise is excellent, and the influence of cross talk is small. Incidentally, other than the foregoing NRZ-I system and I-NRZ-I system, a PR system such as a three-value partial response system can be applied.

In this way, by the MR head of the asymmetric gap structure corresponding to narrowing of a gap, a half-width of a reproduction signal can be made narrow, high recording density can be realized, a stable structure superior in insulation protective resistance can be realized, and deterioration of an SN ratio due to a waveform interference can be sufficiently suppressed.

What is claimed is:

1. A magnetic recording apparatus, comprising:
    a magnetic recording medium having a plurality of recording bits;
    a magnetoresistance head configured to detect a signal magnetic field from the magnetic recording medium, the magnetoresistance head including a magnetic field detecting film, and upper and lower magnetic shielding films provided above and below the magnetic field detecting film through upper and lower magnetic gap films, a distance from a film thickness center of the magnetic field detecting film to the upper magnetic shielding film being different from a distance from the film thickness center to the lower magnetic shielding film;
    a signal processing circuit configured to process a signal from the magnetoresistance head, the signal processing circuit obtaining a reproduction signal of a present bit by subtracting a correction value obtained by multiplying a signal value of a previous bit identified prior to the present bit by a predetermined coefficient from a signal value of the present bit; and
    wherein the distance from film thickness center of the magnetic field detecting film to one of the upper and lower magnetic shielding films is not less than twice the distance from film thickness center of the magnetic field detecting film to another of the upper and lower magnetic shielding films, and the distance from film thickness center of the magnetic field detecting film to the another of the upper and lower magnetic shielding films is less than the distance from magnetic recording medium facing surface of the magnetic field detecting film to the surface of recording layer of the magnetic recording medium.

2. The magnetic recording apparatus as recited in claim 1, wherein a predetermined signal is written prior to a data block of the magnetic recording medium.

3. The magnetic recording apparatus as recited in claim 1, wherein the signal processing circuit obtains the reproduction signal of the present bit by subtracting the correction value obtained by multiplying signal values of a plurality of bits prior to the present bit by predetermined coefficients from the signal value of the present bit.

4. The magnetic recording apparatus as recited in claim 1, wherein in the upper and lower magnetic shielding films, the magnetic shielding film positioned at a place farther from the film thickness center of the magnetic field detecting film is disposed at an downstream side of the magnetic recording medium.

5. The magnetic recording apparatus as recited in claim 1, wherein a thickness of the upper magnetic gap film is different from a thickness of the lower magnetic gap film, and the magnetoresistance head includes an electrode electrically connected to the magnetic field detecting film and positioned at a side of the thicker gap film of the upper and lower magnetic gap films.

6. The magnetic recording apparatus as recited in claim 1, wherein the magnetoresistance head includes two ferromagnetic films and a nonmagnetic film inserted therebetween, magnetization directions of both the ferromagnetic films cross each other at right angles, one of the ferromagnetic films is a fixed film in which the magnetization direction is fixed even in a signal magnetic field, and the other ferromagnetic film is a magnetic field detecting film in which the magnetization direction is changed by receiving the signal magnetic field.

7. A magnetic recording apparatus, comprising:
    a magnetic recording medium with a plurality of recording bits;
    a magnetoresistance head configure to detect a signal magnetic field from the magnetic recording medium, the magnetoresistance head including a magnetic field detecting film, and upper and lower magnetic shielding films provided above and below the magnetic field detecting film through upper and lower magnetic gap films, a distance from a film thickness center of the magnetic field detecting film to the upper magnetic shielding film being different from a distance from the film thickness center to the lower magnetic shielding film; and
    a signal processing circuit configured to process a signal from the magnetoresistance head, the signal processing circuit using a partial response system;
    wherein the distance from film thickness center of the magnetic field detecting film to one of the upper and lower magnetic shielding films is not less than twice the distance from film thickness center of the magnetic field detecting film to another of the upper and lower magnetic shielding films, and the distance from film thickness center of the magnetic field detecting film to the another of the upper and lower magnetic shielding films is less than the distance from magnetic recording medium facing surface of the magnetic field detecting film to the surface of recording layer of the magnetic recording medium.

8. The magnetic recording apparatus as recited in claim 7, wherein in the upper and lower magnetic shielding films, the magnetic shielding film positioned at a place farther from the film thickness center of the magnetic field detecting film is disposed at an downstream side of the magnetic recording medium.

9. The magnetic recording apparatus as recited in claim 7, wherein a thickness of the upper magnetic gap film is different from a thickness of the lower magnetic gap film, and the magnetoresistance head includes an electrode electrically connected to the magnetic field detecting film and positioned at a side of the thicker gap film of the upper and lower magnetic gap films.

10. The magnetic recording apparatus as recited in claim 7, wherein the magnetoresistance head includes two ferromagnetic films and a nonmagnetic film inserted therebetween, magnetization directions of both the ferromagnetic films cross each other at right angles, one of the ferromagnetic films is a fixed film in which the magnetization direction is fixed even in a signal magnetic field, and the other ferromagnetic film is a magnetic field detecting film in which the magnetization direction is changed by receiving the signal magnetic field.

* * * * *